United States Patent Office 3,709,953
Patented Jan. 9, 1973

3,709,953
PROCESS FOR DIMERIZATION, CODIMERIZATION, POLYMERIZATION AND COPOLYMERIZATION OF MONO-OLEFINES
Normann Bergem, Oslo, Ulf Blindheim, Skedsmokorset, Olav-Torgeir Onsager, Baerum, and Hagbarth Wang, Oslo, Norway, assignors to Sentralinstitutt for Industriell forskning, Oslo, Norway
No Drawing. Continuation of application Ser. No. 630,843, Apr. 14, 1967. This application Jan. 9, 1970, Ser. No. 1,892
Claims priority, application Norway, Apr. 15, 1966, 162,601
Int. Cl. C07c 3/10
U.S. Cl. 260—683.15 D                3 Claims

ABSTRACT OF THE DISCLOSURE

The invention relates to a process for the preparation of mono-olefines having a high content of β-olefines in the range $C_4$–$C_{50}$ by dimerization, codimerization, polymerization and copolymerization of mono-olefines from the range $C_2$–$C_{15}$. The conversion is performed in the presence of a catalytic mixture of a compound of a metal from the 8th sub-group of the periodic table, a Lewis acid and, if desired, a Lewis base and/or electron donor-acceptor compounds thereof.

---

This is a continuation application of copending application Ser. No. 630,843, filed Apr. 14, 1967 and now abandoned.

The low-molecular olefines such as ethene, propene, and butene play an important part as raw materials in large scale industrial organic chemistry.

Among the refining processes for these raw materials the dimerization, codimerization, polymerization and copolymerization processes with formation of products in the range $C_4$–$C_{50}$ are of great importance.

From the literature, it is known that beryllium, aluminum, gallium and indium compounds containing Be—H, Al—H, Ga—H, In—H, Be—C—, Al—C—, Ga—C— or In—C— bonds are able to add α-olefines forming higher organic beryllium, aluminum, gallium and indium compounds. Reactions of this type are usually called "addition reactions" ("Aufbaureaktionen") according to the original papers by K. Ziegler in this field. Further, it is known that the influence of lower α-olefines on higher organic beryllium and aluminum compounds under other reaction conditions may have a substituting effect, whereby the higher alkyl groups are displaced in the organometallic compound with the formation of α-olefines. This so-called "displacement reaction ("Verdrängungsreaktion") is catalyzed by metallic cobalt, platinum and nickel and particularly by metallic nickel in finely divided colloidal form. By a combination of addition reaction with subsequent displacement reaction, it is thus possible to convert lower α-olefines into higher α-olefines. Thus a dimerization of ethene with Al(ethyl)₃ as addition catalyst gives n-butene-1, a trimerization of ethene gives n-hexene-1, a tetramerization of ethene gives n-octene-1 as reaction product, etc. By the dimerization of propene with Al(propyl)₃/colloidal nickel as catalyst 2-methylpentene-1 is formed as reaction product (German Pat. No. 964,642, German Auslegeschrift No. 1,178,419 and U.S. Pat. No. 2, 695,327). Drawbacks of the known oligomerization processes of the Ziegler type are, in addition to the heterogenous character of the catalyst systems due to the transition metal addition, that very high catalyst concentrations of the organic beryllium or aluminum compounds are used, up to 20% of the reaction mixture. In addition these mixtures are highly inflammable and explosive at the high temperatures and pressures—up to 250° C./200 atm.—which are necessary to obtain a satisfactory time yield during the syntheses.

From U.S. Pat. No. 2,969,408, it is known that additions of nickel compounds in the form of salts of inorganic and organic acids or in the form of certain organonickel complexes are able to cause the same type of displacement reaction as colloidal metallic nickel and together with organometallic halides give α-olefines as primary reaction product. In the examples given in the patent the nickel compound is reduced to metallic nickel, which means that the catalyst systems used are of the same type as the ones discussed above.

Thus, it is a characteristic feature of the known oligomerization reactions of the Ziegler type that lower α-olefines take part in an addition reaction and that in the subsequent displacement reaction higher α-olefines are liberated as reaction product.

Further, it is known from Belgian Pat. No. 651,596 that π-allyl-transition metal compounds such as (π-allyl)₂Ni or (π-allyl)Ni-halide in combination with Lewis acid compounds of the metals from the 3rd main group of the periodic table such as Al(C₂H₅)Cl₂ or AlBr₃ represent active catalyst systems for the oligomerization of olefines, wherein the catalytic activity is caused by the presence of the unstable and easily decomposable transition metal-allyl bonds (Angew. Chem., vol. 78, No. 3 (1966) 71). Due to the complicated character and the partly very unstable nature of the π-allyl-transition metal compounds mentioned above, syntheses and work with such compounds are bound up with great operational difficulties.

We have now surprisingly found that a series of stable and easily available transition metal compounds of the transition metals from the 8th subgroup of the periodic table in combination with Lewis acid compounds of the elements of the 2nd and 3rd main group represent very active, homogeneously acting catalyst systems for dimerization, codimerization, polymerization and copolymerization of mono-olefines from the range $C_2$–$C_{15}$ with the formation of mono-olefines in the range $C_4$–$C_{50}$ having a high content of β-olefines, at very low catalyst concentrations and mild reaction conditions.

Further, we have found that by adding Lewis bases in the form of compounds of the elements of the 5th and 6th main group of the periodic table containing one or more of the following functional base groups:

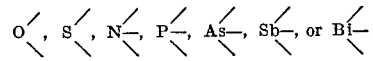

such as ethers, thioethers, disulfides, amines, pyridine compounds, phosphorus trihalides, phosphines, diphosphines, polyphosphines, phosphine oxides, phosphites, arsines and the like, which all in principle contain a free electron pair, it is possible to vary the activity as well as the selectivity of the catalyst systems.

As Lewis acid, use is made of one or more compounds of the type: Al(Y)₃, Ga(Y)₃, In(Y)₃, Be(R)₂, Be(R)(Y)

Al(R)$_a$—(Y)$_{3-a}$, Ga(R)$_a$(Y)$_{3-a}$ or In(R)$_a$(Y)$_{3-a}$, in which R represents H and/or an aliphatic or aromatic hydrocarbon radical containing 1–50 carbon atoms, Y is a halide, alcoholate, mercaptide, amine and/or phosphide equivalent, and $a$ is 1 to 2, such as:

Al(Br)₃
Ga(Br)₃
In(Br)₃
Al(O-C₂H₅)Br₂
Al(O-n-C₄H₉)₂Cl

Al(O-iso-C$_3$H$_7$)$_3$
Be(C$_2$H$_5$)$_2$
Be(C$_4$H$_9$)(Cl)
Al(CH$_3$)(Cl)$_2$
Al(C$_2$H$_5$)(Cl)$_2$
Al(n-C$_4$H$_9$)(Cl)$_2$
Al(C$_6$H$_5$)(O-C$_2$H$_5$)Cl
Al(isoprenyl)Cl$_2$
Al(C$_2$H$_5$)(p-tolyl-mercaptide)Cl
Al(C$_2$H$_5$)(N-(C$_6$H$_5$)$_2$)(Br)
Al(C$_{10}$H$_{21}$)(Br)(Cl)
Al(cyclohexyl)(O-n-C$_4$H$_9$)(Cl)
Al(H)(iso-C$_4$H$_9$)(Cl)
Al$_2$(C$_2$H$_5$)$_3$(Cl)$_3$
Al(C$_2$H$_5$)$_2$(Cl)
Al(C$_2$H$_5$)$_2$(F)
Al(iso-C$_3$H$_7$)$_2$(Br)
Al(n-C$_8$H$_{17}$)$_2$(Cl)
Al(C$_2$H$_5$)(iso-C$_4$H$_9$)(Cl)
Al(C$_2$H$_5$)(I)$_2$ The fact that it is also possible to use catalyst systems in which neither the Lewis acid nor the the transition metal compound (see below) contain metal-carbon bonds is very surprising. A characteristic feature of the prior art catalyst systems for oligomerization of olefines is that at least one of the catalyst components contains metal-carbon bonds, either in the form of main group metal-carbon bond or in the form of transition metal-carbon bond. From the literature it appears clearly that the presence of metal-carbon bonds in at least one of the catalyst components is a necessary and vital condition for the catalytic activity.

As transition metal compound, use is made of one or more compounds of the type Me(X)$_n$, in which Me=transition metal from the 8th subgroup of the periodic table, X=an equivalent of an inorganic and/or organic acid radical, including organic chelate compounds, and $n$=2 or 3. Illustrative examples of such compounds are for instance the following compounds of cobalt and nickel:

CoCl$_2$
CoBr$_2$
Co(acetate)$_2$
Co(acetylacetonate)$_3$
Co(propionate)$_2$
Co(stearate)$_2$
Co(acetoacetic ester)$_3$
NiCl$_2$
NiBr$_2$
NiI$_2$
Ni(SO$_4$)
Ni(NO$_3$)$_2$
Ni(SCN)$_2$
Ni(CN)$_2$ Ni(CrO$_4$)
Ni(formate)$_2$
Ni(acetate)$_2$
Ni(chloroacetate)$_2$
Ni(fluoroacetate)$_2$
Ni(benzoate)$_2$
Ni(stearate)$_2$
Ni(oxalate)
Ni(thiophenolate)$_2$
Ni(oxine)$_2$
Ni(benzoyl acetonate)$_2$
Ni(dimethylglyoxime)$_2$
etc.

A characteristic feature of the Me(X)$_n$ compounds providing the most advantageous catalyst systems both with respect to selectivity and activity, is that they may be coupled directly with said Lewis base compounds of the elements of the 5th or the 6th main group, or that they may be coupled indirectly by forming compounds together with the Lewis acid compounds of the elements of the 2nd and 3rd main group which may be coupled with the above-mentioned types of Lewis bases with the formation of soluble electron donor-acceptor complexes.

The direct or indirect coupling reactions may be performed separately or in situ in the reaction mixture. The direct coupling reactions are preferably performed separately in polar organic solvents, such as alcohols, ethers and the like, in those cases where Me(X)$_n$ is slightly soluble in the reaction medium. The Me(X)$_n$·Lewis base compounds are isolated as such and used as catalyst components. Typical Me(X)$_n$·Lewis base compounds which are very active catalyst components are compounds of the following types:

(I) Me(D)$_2$X$_2$
(II) Me(D—D)X$_2$
(III) Me(D)X$_2$
(IV) Me(D)$_2$X$_3$
(V) Me(D—D)$_2$X$_3$
(VI) Me(D)$_4$X$_2$
(VII) Me(D—D)$_2$X$_2$ in which D represents a Lewis base equivalent, D—D is a bifunctional Lewis base attached to Me through two functional base groups, and Me and X are as above. It is also possible to use Lewis bases containing more than two Lewis base groups per molecule.

Examples of compounds of type I:

(tri-ethylphosphine)$_2$-cobalt-chloride,
(pyridine)$_2$-cobalt-chloride,
(dioxane)$_2$-cobalt-chloride,
(tri-n-butylphosphine)$_2$-nickel-sulfate,
(tri-n-butylphosphine)$_2$-nickel-chloroacetate,
(tri-n-butylphosphine)$_2$-nickel-fluoroacetate,
(tri-cyclohexylphosphine)$_2$-nickel-bromide,
(tri-iso-propylphosphine)$_2$-nickel-iodide,
(tri-di-n-butylaminophosphine)$_2$-nickel-bromide,
(tri-n-butylphosphine)$_2$-nickel-thiophenolate,
(tri-n-hexylphosphine)$_2$-nickel-rhodanide and the like.

Examples of compounds of type II:

(ethylenediamine)-nickel-chloride,
(1,2-bis-diethylphosphine-ethane)-nickel-bromide,
(2,2'-dipyridyl)-nickel-iodide,
(1,5-bis-dicyclohexylphosphino-pentane)-nickel-chloroacetate
(o-phenanthroline)-nickel-nitrite and the like.

Example of compounds of type III:

(tri-propylphosphine)-nickel-cyclopentadienyl-chloride.

Example of compounds of type IV:

(tri-ethylphosphine)$_2$-nickel-tribromide.

Example of compounds of type V:

(o-phenylene-bis-dimethylarsine)$_2$-nickel-trichloride.

Examples of compounds of type VI:

(pyridine)$_4$-nickel-rhodanide,
(pyridine)$_4$-cobalt-bromide.

Examples of compounds of type VII:

(ethylenediamine)$_2$-nickel-chloride,
(ethylenediamine)$_2$-cobalt-bromide.

Analogous to the transition metal compounds, the Lewis acid compounds may also be coupled with Lewis bases forming Lewis base·Lewis acid compounds and used in such form in the catalyst system. In the following examples of such reactions are given:

(1) AlBr$_3$+P(n-C$_4$H$_9$)$_3$⇌AlBr$_3$·P(n-C$_4$H$_9$)$_3$
(2) Al(C$_2$H$_5$)Cl$_2$+P(phenyl)$_3$⇌
    Al(C$_2$H$_5$)Cl$_2$·P(phenyl)$_3$
(3) Al(C$_6$H$_5$)Cl$_2$+P(N(n-C$_4$H$_9$)$_2$)$_3$⇌
    Al(C$_6$H$_5$)Cl$_2$·P(N(n-C$_4$H$_9$)$_2$)$_3$
(4) AlHBr$_2$+(C$_2$H$_5$)$_2$O⇌AlHBr$_2$·O(C$_2$H$_5$)$_2$ By using a Lewis acid·Lewis base compound free Lewis acid and free Lewis base are simultaneously introduced into the catalyst system since these are connected to the Lewis acid·Lewis base compounds through equilibrium reactions.

Thus, the Lewis base compounds either may be introduced into the reaction mixture as such or in the form of compounds with transition metal compounds and/or Lewis acid compounds.

The formation of the active catalyst system is very simple since this occurs at the mixing of the two, possibly three, types of catalyst components, preferably in an organic solvent such as chlorobenzene, bromobenzene, chloroform, dichloroethane, methylene chloride, benzene, tolurene, xylene, heptane, higher paraffins and the like in an olefine atmosphere or inert atmosphere.

A characteristic feature of the new catalyst systems described herein is that Me in the transition metal compound is not substantially reduced to metallic form and that the catalytic activity for the oligomerization reactions is caused by the presence of soluble transition metal complexes. This appears clearly from the selectivity and high activity of the catalyst systems compared with the previously known catalyst systems. Thus the activity of the new catalyst systems is very high already at as mild conditions as 20° C./1. atm. pressure using Lewis acids such as $AlBr_3$ and $Al(C_2H_5)Cl_2$ in the catalyst system. In view of the prior art, it is clear that the reactions taking place in the process according to the present invention are not an addition reaction and a displacement reaction of the Ziegler type. That the catalyst systems used according to the present invention are not previously known also is clear from the composition of the mono-olefines formed, since $\beta$- and $\gamma$-olefines are obtained in such high amounts that these cannot have been formed entirely by isomerization of $\alpha$-olefines, but have to be primary reaction products as well.

Thus, by dimerization of propene to compounds having 2-methylpentene structure, the $\beta$-olefine 4-methylpentene-2 is formed as primary reaction product. In addition, the dimerization of propene under given reaction conditions may be regulated to give $C_6$-olefines having a high content of double-branched olefines, such as 2,3-dimethylbutenes. Trimerization of ethene and codimerization of ethene and butene-2 and/or butene-1 gives $C_6$-olefines having primarily 3-methylpentene structure, 3-methylpentene-2 being the predominant reaction product.

The selectivity of the catalyst systems is to a great extent dependent on the base strength and the amount of Lewis base used. Thus, catalyst systems containing strong Lewis bases such as tri-n-butylphosphine, tri-cyclohexylphosphine, tri-iso-propyl-phosphine, 1,5-bis-dicyclohexylphosphinopentane and tri-n-butylaminophosphine, will give more products having a higher degree of branching than corresponding catalyst systems under otherwise similar conditions where tri-phenylphosphine is used as Lewis base. The amount of branched reaction products also increases with the amount of Lewis base added.

According to the present invention, it is for instance possible to codimerize ethene and propene to $C_5$-olefines in which more than 90% of $C_5$-olefines have iso-pentane structure, by using a strong Lewis base such as tri-cyclohexylphosphine in the catalyst system.

In addition to being very active dimerization, codimerization, polydimerization and copolymerization catalysts, the soluble catalyst systems have a partly very rapid double bond isomerizing effect on the olefines in the reaction mixture. The isomerization activity decreases with decreasing reaction temperature, increasing base strength and increasing amount of the Lewis bases used in the catalyst systems.

By using polar organic solvents in the reaction mixture, higher rates of reaction are usually obtained than when the reactions are performed in a less polar medium. Thus higher rates of reaction are obtained when using chlorobenzene or bromobenzene as solvent compared with the otherwise same system in which benzene or n-heptane is used as solvent. Further, the use of a polar reaction medium will usually favor the formation of branched olefines. It is preferred to use a solvent which may easily be separated from the reaction products when the latter are recovered from the reaction mixture.

The concentration of the Lewis acid as well as the molar ratio between the Lewis acid and the transition metal compounds may be varied within wide limits. For the process the concentration of the Lewis acid is suitably chosen within the range of 0.001–0.100 mole/liter and the molar ratio of transition metal to Lewis acid in the range 1:1–0.01:1.

The amount of Lewis base in the catalyst system is suitably chosen so that the ratio between the base equivalents in the reaction mixture and the sum of the number of moles of transition metal compounds plus Lewis acid does not exceed 1.6. A ratio in the range 1–0.02 is preferred. As used herein base equivalent means a Lewis base group having one free electron pair. Thus, for example tributylphosphine has one base equivalent per mole, while 1,5-bis-dicyclohexylphosphinopentane has two base equivalents per mole.

The present invention provides a process for the preparation of mono-olefines having a high content of $\beta$-olefines from the range $C_4$–$C_{50}$ by dimerization, codimerization, polymerization and copolymerization of mono-olefines. The invention is characterized by the fact that olefines from the range $C_2$–$C_{15}$ are converted in the presence of catalytic mixtures selected from one or more of the following six types:

$Me(X')_n + A(Y)_3$
$Me(X)_n + \text{Lewis acid} + \text{Lewis base}$
$Me(X)_n + \text{Lewis acid} \cdot \text{Lewis base}$
$Me(X)_n \cdot \text{Lewis base} + \text{Lewis acid}$
$Me(X)_n \cdot \text{Lewis base} + \text{Lewis acid} + \text{Lewis base}$
$Me(X)_n \cdot \text{Lewis base} + \text{Lewis acid} \cdot \text{Lewis base}$ wherein Me=transition metal from the 8th subgroup of the periodic table; $X'$=organic chelate ligand, organic and/or inorganic acid radical; A=Al, Ga and/or In, $n$=2–3; Y=halide, alcoholate, mercaptide, amide and/or phosphide equivalent; Lewis acid is $Al(Y)_3$, $Ga(Y)_3$, $In(Y)_3$, $Be(R)(Y)$, $Be(R)_2$, $Al(R)_a(Y)_{3-a}$, $$Ga(R)_a(Y)_{3-a}$$

and/or $In(R)_a(Y)_{3-a}$, wherein Y has the same meaning as above, R=hydrogen and/or aliphatic or aromatic hydrocarbon radical containing 1–50 carbon atoms, and $a$=1–2; Lewis base is a mono-, di- or polyfunctional organic or inorganic compound containing one or more of the following base groups:

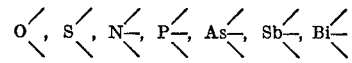

and $Me(X)_n \cdot$Lewis base and Lewis acid$\cdot$Lewis base represent electron donor-acceptor compounds of Lewis base with $Me(X)_n$ and Lewis acid respectively; at such a low temperature that Me in the compounds $Me(X)_n$ are not substantially reduced to metallic form, preferably at a temperature not above 100° C.

The process according to the invention may be performed at pressures from fractions of an atmosphere up to very large pressures, limited only by the apparatus construction. It is, however, advantageous, out of regard for temperature control, that the reactions take place at pressures not exceeding 100 atm. If a catalyst combination with pure inorganic Lewis acids such as $AlBr_3$ is employed, the temperature may be varied within wide limits, preferably not above 150° C. However, if the process is performed with organometallic Lewis acids in the catalyst system, such as $Al(alkyl)_2(halide)$, $Al(aryl)(halide)_2$, $Al(alkoxy)(alkyl)(halide)$, $Be(alkyl)_2$, $Ga(alkyl)(halide)_2$ or $In(alkyl)(halide)_2$, the reducing effect which lies in the main group metal-carbon bonds Be—C, Al—C, Ga—C and In—C may lead to a reduction of the transition metal compounds if the temperature during the reaction becomes too high. The reaction temperature should therefore suitably be kept below the temperature range in which a substantial part of the transition metal compound during the reaction is reduced to metallic form. Such a reduction may be observed as a blackening of the solution due to precipitation of transition metal. The highest reaction temperature may be employed in the processes utilizing the most stable transition metal compounds in combination with the least reduction active organic main group metal compounds, but should preferably not exceed 100° C.

The process can be carried out either discontinuously, for example, by charging the catalyst components together with a solvent, if necessary, into a thermostat-regulated reaction vessel, passing the monomer or the monomer mixture into the catalyst mixture for some time, e.g. 1–5 hours, and then recovering the reaction product by the usual working-up methods, or continuously, for example by passing the monomer or the monomer mixture through the catalyst mixture if desired under pressure, with subsequent continuous isolation of the reaction product from the outflowing reaction mixture. Unreacted monomer and solvent, if any, and catalyst are separated from the reaction product during the isolation of the latter and are suitably recirculated to the reaction vessel. By the process according to the invention, when the monomer is a liquid, solvent can be omitted with advantage.

As starting material for the process, there may be used both $\alpha$- and $\beta$-olefines or olefines in which the double bond is situated further into the molecule.

APPARATUS AND TECHNIQUE

For Examples 1–14 and 16–47 the following apparatus and work technique are used:

One or more of the above-mentioned types of transition metal compounds together with possible Lewis base compound, are charged into a thermostat-regulated glass reaction flask, equipped with a magnetic stirrer, reflux condenser and dropping funnel with pressure-equalizing means. On the top of the reflux condenser there is a possibility of connection to vacuum, highly purified argon and starting-monomer for the syntheses. Under argon flush the desired quantity of abs. solvent (distilled over $P_2O_5$ and $LiAlH_4$ or Na and organo-aluminum compounds) is added to the reaction vessel. (In those cases where volatile Lewis bases are used, e.g. tri-butyl-phosphine, these are added to the reaction vessel at this stage.) A Lewis acid of the above-mentioned type or mixtures of these are, if necessary diluted with solvent, then added to the dropping funnel in argon atmosphere. The whole apparatus is then carefully evacuated three times and after each time filled with starting-monomer required to maintain constant pressure in the reaction flask (1 atm.) is measured with a capillary flow meter as a function of reaction time. The bath temperature is kept constant within the limits $\pm 0.05°$ C. by means of a water-circulation thermostat. After a certain reaction time the conversion is stopped and the reaction mixture is gas-chromatographically analyzed.

For examples 15 and 48–54 the following apparatus and work technique are used:

The reaction is carried out in a non-magnetic, acid-resistant steel autoclave having a volume of 200 ml. The autoclave is connected with a glass container which could be evacuated. The connection between the two vessels could be closed by means of a high pressure valve. Before the run, the autoclave and glass container are evacuated to less than 0.5 mm. Hg in 30 min. The valve between the two vessels is closed and the glass container filled with highly purified nitrogen. The catalyst components and the solvent are then poured into the glass container in nitrogen atmosphere.

By opening the valve between the two vessels, the catalyst solution is sucked into the evacuated autoclave. The connection to the vacuum pump is cut off in advance. The autoclave is then filled with monomer to the indicated pressure, which is kept constant during the whole reaction period. The autoclave is fitted with magnetic stirrer and stood in a water bath with the stated temperatures $\pm 0.1°$ C. The reaction mixtures are gas-chromatographically analyzed.

In the examples, "atm." is atmosphere(s), "ml." is milliliter(s), "mg." is milligrams, "min." is minute(s). Percentages are by weight.

EXAMPLE 1

Temperature: 20° C.
Pressure: 1 atm.
Solvent: 25 ml. chlorobenzene.
Monomer: Ethene.
Catalyst: 25 mg. nickel(II) chloride, 25.3 mg. tri-n-butyl-phosphine and 63.5 mg. aluminum-monoethyl-dichloride.
Reaction time: 30 min.
Reaction product formed: 9 ml.

Composition of product 78.0% $C_4$-olefins (of which 2.3% butene-1, 68.6% butene-2-trans and 29.1% butene-2-cis),
20% $C_6$-olefines (of which 0.9% 3-methylpentene-1, 2.2% hexene-3-cis/trans, 17.3% 2-ethylbutene-1, 9.6% hexene-2-trans, 24.7% 3-methylpentene-2-trans and 45.3% 3-methyl-pentene-2-cis),
2% $C_8$-olefins and higher.

EXAMPLE 2

Temperature: 20° C.
Pressure: 1 atm.
Solvent: 25 ml. chlorobenzene.
Monomer: Ethene.
Catalyst: 22 mg. nickel(II)acetylacetonate, 25.3 mg. tri-n-butylphosphine and 63.5 mg. aluminum-monoethyl-dichloride.
Reaction time: 60 min.
Reaction product formed: 22 ml.

Composition of product

47% $C_4$-olefines (of which 2.2% butene-1, 71.4% butene-2-trans and 26.4% butene-2-cis),
43% $C_6$-olefines (of which 0.4% 3-methylpentene-1, 2.7% hexene-3-cis/trans, 12.9% 2-ethylbutene-1, 9.4% hexene-2-trans, 25.0% 3-methylpentene-2-trans and 49.6% 3-methylpentene-2-cis),
10% $C_8$-olefines and higher.

EXAMPLE 3

Temperature: 20° C.
Pressure: 1 atm.
Solvent: 25 ml. benzene.
Monomer: Ethene.
Catalyst: 16.0 mg. cobalt(II)acetylacetonate, 25.3 mg. tri-n-butyl-phosphine and 63.5 mg. aluminum-monoethyl-dichloride.
Reaction time: 60 min.
Reaction product formed: 15 ml.

Composition of product

96% $C_4$-olefines (of which 2.9% butene-1, 68.7% butene-2-trans and 28.4% butene-2-cis),
3% $C_6$-olefines,
1% $C_8$-olefines and higher.

EXAMPLE 4

Temperature: 20° C.
Pressure: 1 atm.
Solvent: 25 ml. chlorobenzene.
Monomer: Ethene.
Catalyst: 16 mg. nickel(II)acetylacetonate, 25.3 mg. tri-n-butylphosphine and 133 mg. aluminum tribromide.
Reaction time: 30 min.
Reaction product formed: 11 ml.

Composition of product

80% $C_4$-olefines (of which 1.2% butene-1, 71.6% butene-2-trans and 27.2% butene-2-cis),
13% $C_6$-olefines (of which 4.5% 3-methylpentene-1, 9.3% hexene - 3 - cis/trans, 23.8% hexene - 2 - trans, 14.8% 3-methylpentene-2-trans, 11.5% hexene-2-cis and 36.1% 3-methylpentene-2-cis),
7% $C_8$-olefines and higher.

EXAMPLE 5

Temperature: 20° C.
Pressure: 1 atm.
Solvent: 25 ml. chlorobenzene.
Monomer: Ethene.
Catalyst: 16 mg. nickel(II)acetylacetonate, 38.2 mg. triphenylarsine and 63.5 mg. aluminum-monoethyl-dichloride.
Reaction time: 60 min.
Reaction product formed: 12 ml.

Composition of product

72% $C_4$-olefines (of which 2.0% butene-1, 70% butene-2-trans and 28% butene-2-cis),
26% $C_6$-olefines (of which 5.5% hexene-3-cis/trans, 3.6% 2-ethylbutene-1, 14.3% hexene-2-trans, 25.9% 3-methylpentene-2-trans and 50.7% 3-methyl-pentene-2-cis),
2% $C_8$-olefines and higher.

EXAMPLE 6

Temperature: 20° C.
Pressure: 1 atm.
Solvent: 25 ml. chlorobenzene.
Monomer: Ethene.
Catalyst: 16 mg. nickel(II)acetylacetonate, 21.2 mg. diphenylether and 63.5 mg. aluminum-monoethyl-dichloride.
Reaction time: 30 min.
Reaction product formed: 12 ml.

Composition of product

60% $C_4$-olefines (of which 2.5% butene-1, 70% butene-2-trans and 27.5% butene-2-cis),
37% $C_6$-olefines (of which 0.5% 3-methylpentene-1, 7.6% hexene-3 - cis/trans, 19.4% hexene-2-trans, 26.9% 3-methyl-pentene-2-trans and 45.6% 3-methyl-pentene-2-cis),
3% $C_8$-olefines and higher.

EXAMPLE 7

Temperature: 20° C.
Pressure: 1 atm.
Solvent: 25 ml. chlorobenzene.
Monomer: Ethene.
Catalyst: 11 mg. cobalt(II)acetate, 38.2 mg. triphenylphosphine and 63.5 mg. aluminum-monoethyl-dichloride.
Reaction time: 30 min.
Reaction product formed: 5 ml.

Composition of product

94% $C_4$-olefines (of which 2.2% butene-1, 69.6% butene-2-trans and 28.2% butene-2-cis),
5% $C_6$-olefines (of which 7.7% 3-methylpentene-1, 5.8% hexene-3-cis/trans, 19.2% 2-ethylbutene-1, 13.5% 3-methyl-pentene-2-trans, 7.7% hexene-2-cis and 26.9% 3-methyl-pentene-2-cis),
1% $C_8$-olefines and higher.

EXAMPLE 8

Temperature: 20° C.
Pressure: 1 atm.
Solvent: 25 ml. chlorobenzene.
Monomer: Ethene/Propene=1/1 (gas volume 20° C.).
Catalyst: 11 mg. nickel(II)acetate, 30.6 mg. triphenylamine and 63.5 mg. aluminum-monoethyl-dichloride.
Reaction time: 30 min.
Reaction product formed: 19 ml.

Composition of product 9.5% $C_4$-olefines (of which 2.6% butene-1, 69.4% butene-2-trans and 28.0% butene-2-cis),
51.5% $C_5$-olefines (of which 44.2% n-pentene isomers and 55.8% 2-methylbutene isomers),
33.0% $C_6$-olefines (of which 52.9% 2-methylpentene isomers, 9.9% n-hexene isomers, 25.0% 3-methylpentene isomers, 10.2% 2,3-dimethylbutene isomers and 2.0% 2-ethylbutene isomers),
6% $C_7$-olefines and higher.

EXAMPLE 9

Temperature: 20° C.
Pressure: 1 atm.
Solvent: 25 ml. chlorobenzene.
Monomer: Propene.
Catalyst: 11 mg. nickel(II)acetate, 13.7 mg. diphenyldisulphide and 63.5 mg. aluminum-monoethyldichloride.
Reaction time: 30 min.
Reaction product formed: 15 ml.

Composition of product

94% $C_6$-olefines (of which 0.4% 4-methylpentene-1, 1.2% 4-methylpentene-2-cis, 9.6% 4-methylpentene-2-trans, 6.3% 2-methylpentene-1, 4.8% hexene-3-cis/trans, 13.2% hexene-2-trans, 56.6% 2-methylpentene-2, 4.1% hexene-2-cis and 3.9% 2,3-dimethylbutene-2),
6% $C_9$-olefines and higher.

EXAMPLE 10

Temperature: 20° C.
Pressure: 1 atm.
Solvent: 25 ml. chlorobenzene.
Monomer: Propene.
Catalyst: 11 mg. nickel(II)acetate and 133 mg. aluminum-tri-bromide.
Reaction time: 30 min.
Reaction product formed: 5 ml.

Composition of product

95% $C_6$-olefines (of which 2.3% 4-methylpentene-1, 8.1% 4-methylpentene-2-cis, 62.1% 4-methylpentene-2-trans, 1.6% 2-methylpentene-1, 4.4% hexene-3-cis/trans, 18.3% 2-methylpentene-2 and 4.5% hexene-2-cis),
5% $C_9$-olefines and higher.

EXAMPLE 11

Temperature: 20° C.
Pressure: 1 atm.
Solvent: 25 ml. methylenechloride.
Monomer: Propene.
Catalyst: 11 mg. palladium(II)chloride, 25.3 mg. tri-n-butyl-phosphine and 133 mg. aluminum bromide.
Reaction time: 30 min.
Reaction product formed: 7 g. oil having an average degree of polymerization of 15, determined by iodine value.

EXAMPLE 12

Temperature: 20° C.
Pressure: 1 atm.
Solvent: 25 ml. benzene.
Monomer: Propene.
Catalyst: 33.4 mg. di-(tri-n-butylphosphine)-nickel(II) chloride and 63.5 mg. aluminum-monoethyl-dichloride.
Reaction time: 30 min.
Reaction product formed: 28 ml.

Composition of product

88% $C_6$-olefines (of which 0.7% 4-methylpentene-1, 2.8% 4-methylpentene-2-cis, 32.2% 4-methylpentene-2-trans, 8.5% 2-methylpentene-1, 2.1% hexene-3-cis/trans, 6.2% hexene-2-trans, 39.3% 2-methylpentene-2, 1.6% hexene-2-cis and 6.6% 2,3-dimethylbutene-2),
12% $C_9$-olefines and higher.

EXAMPLE 13

Temperature: 20° C.
Pressure: 1 atm.
Solvent: 25 ml. chlorobenzene.
Monomer: Propene.
Catalyst: 33.4 mg. $NiCl_2/P(n\text{-butyl})_{3/2}$ and 60.28 mg. $Al(ethyl)_2Cl$.
Reaction time: 30 min.
Reaction product formed: 15 ml.

Composition of product 98.0% $C_6$-olefines (of which 0.5% 4-methylpentene-1, 1.8% 4-methylpentene-2-cis, 21.1% 4-methylpentene-2-trans, 9.7% 2-methylpentene-1, 3.1% hexene-3-cis/trans, 9.4% hexene-2-trans, 45.7% 2-methylpentene-2, 2.8% hexene-2-cis and 5.9% 2,3-dimethylbutene-2), 2% $C_9$-olefines and higher.

EXAMPLE 14

Temperature: 20° C.
Pressure: 1 atm.
Solvent: 25 ml. chlorobenzene.
Monomer: Propene.
Catalyst: 15.6 mg. $NiBr_2[P(n\text{-butyl})_3]_2$ and 253.92 mg. $Al(ethyl)Cl_2$
Reaction time: 30 min.
Reaction product formed: 34 ml.

Composition of product 96.0% $C_6$-olefines (of which 0.9% 4-methylpentene-1, 3.4% 4-methylpentene-2-cis, 23.5% 4-methylpentene-2-trans, 0.4% 2-methylpentene-1, 2.3% hexene-3-cis/trans, 6.2% hexene-2-trans, 41.4% 2-methylpentene-2, 2.4% hexene-3-cis and 19.5% 2,3-dimethylbutene-2), 4% $C_9$-olefines and higher.

EXAMPLE 15

Temperature: 0° C.
Pressure: 7 atm.
Solvent: 25 ml. chlorobenzene.
Monomer: Ethene
Catalyst: 11 mg. nickel(II)acetate, 38.2 triphenylphosphine and 63.5 mg. $Al(ethyl)Cl_2$.
Reaction time: 15 min.
Reaction product formed: 35 ml.

Composition of product

63% $C_4$-olefines (of which 1.9% butene-1, 71.5% butene-2-trans and 26.6% butene-2-cis),
32% $C_6$-olefines (of which 4.0% hexene-3-cis/trans, 14.5% 2-ethylbutene-1, 15.3% hexene-2-trans, 22.8% 3-methylpentene-2-trans and 43.4% 3-methylpentene-2-cis),
5% $C_8$-olefines and higher.

EXAMPLE 16

Temperature: 40° C.
Pressure: 1 atm.
Solvent: 25 ml. chlorobenzene.
Monomer: Propene.
Catalyst: 15.6 mg. $NiBr_2[P(n\text{-butyl})_3]_2$ and 15.87 mg. $Al(ethyl)Cl_2$
Reaction time: 30 min.
Reaction product formed: 13 ml.

Composition of product 93.0% $C_6$-olefines (of which 0.8% 4-methylpentene-1, 1.7% 4-methylpentene-2-cis, 14.6% 2,3-dimethylbutene-1, 16.1% 4-methylpentene-2-trans, 1.4% hexene-1, 6.9% 2-methylpentene-1, 1.6% hexene-3-cis/trans, 4.3% hexene-2-trans, 38.1% 2-methylpentene-2, 1.7% hexene-2-cis and 12.8% 2,3-dimethylbutene-2), 7% $C_9$ olefines and higher.

EXAMPLE 17

Temperature: 0° C.
Pressure: 1 atm.
Solvent: 25 ml. n-heptane.
Monomer: Propene.
Catalyst: 17.25 mg. $NiBr_2[P(cyclohexyl)_3]_2$ and 15.87 mg. $Al(ethyl)Cl_2$.
Reaction time: 60 min.
Reaction product formed: 9 ml.

Composition of product 91.9% $C_6$-olefins (of which 5.4% 4-methylpentene-1, 3.2% 4-methylpentene-2-cis, 50.1% 2,3-dimethylbutene-1, 8.0% 4-methylpentene-2-trans, 25.0% 2-methylpentene-1, 2.3% hexene-2-trans, 2.3% 2-methylpentene-2, 2.4% hexene-2-cis and 1.4% 2,3-dimethylbutene-2), 8.1% $C_9$-olefines and higher.

EXAMPLE 18

Temperature: 20° C.
Pressure: 1 atm.
Solvent: 25 ml. chlorobenzene.
Monomer: Propene.
Catalyst: 43.2 mg. $Ni(NO_3)_2 \cdot [P(phenyl)_3]_2$ and 63.48 mg. $Al(ethyl)Cl_2$.
Reaction time: 30 min.
Reaction product formed: 19 ml.

Composition of product 87.5% $C_6$-olefines (of which 0.7% 4-methylpentene-1, 1.4% 4-methylpentene-2-cis, 24.0% 4-methylpentene-2-trans, 9.9% 2-methylpentene-1, 4.2% hexene-3-cis/trans, 9.3% hexene-2-trans, 44.3% 2-methylpentene-2, 4.0% hexene-2-cis and 2.1% 2,3-dimethylbutene-2), 12.5% $C_9$-olefines and higher.

EXAMPLE 19

Temperature: 20° C.
Pressure: 1 atm.
Solvent: 25 ml. chlorobenzene.
Monomer: Propene.
Catalyst: 36.3 mg. $Ni(SCN)_2 \cdot [P(n\text{-butyl})_3]_2$ and 63.48 mg. $Al(ethyl)Cl_2$.
Reaction time: 30 min.
Reaction product formed: 18 ml.

Composition of product 95.4% $C_6$-olefines (of which 0.8% 4-methylpentene-1, 1.6% 4-methylpentene-2-cis, 35.7% 4-methylpentene-2-trans, 7.8% 2-methylpentene-1, 1.8% hexene-3-cis/trans, 4.5% hexene-2-trans, 38.9% 2-methylpentene-2, 1.8% hexene-2-cis and 6.9% 2,3-dimethylbutene-2), 4.6% $C_9$-olefines and higher.

EXAMPLE 20

Temperature: 20° C.
Pressure: 1 atm.
Solvent: 25 ml. chlorobenzene.
Monomer: Propene.
Catalyst: 52.3 mg. $NiI_2 \cdot [P(phenyl)_3]_2$ and 63.48 mg. $Al(ethyl)Cl_2$.
Reaction time: 30 min.
Reaction product formed: 19 ml.

Composition of product 94.1% $C_6$-olefines (of which 0.4% 4-methylpentene-1, 1.2% 4-methylpentene-2-cis, 20.9% 4-methylpentene-2-trans, 8.7% 2-methylpentene-1, 4.2% hexene-3-cis/trans, 8.6% hexene-2-trans, 48.8% 2-methylpentene-2, 3.5% hexene-2-cis and 3.8% 2,3-dimethylbutene-2), 5.9% $C_9$-olefines and higher.

EXAMPLE 21

Temperature: 20° C.
Pressure: 1 atm.
Solvent: 25 ml. chlorobenzene.
Monomer: Propene.
Catalyst: 34.9 mg. $NiSO_4 \cdot [P(n\text{-butyl})_3]_2$ and 63.48 mg. $Al(ethyl)Cl_2$.
Reaction time: 30 min.
Reaction product formed: 32 ml.

Composition of product 93.6% $C_6$-olefines (of which 0.4% 4-methylpentene-1, 1.3% 4-methylpentene-2-cis, 30.1% 4-methylpentene-2-trans, 6.8% 2-methylpentene-1, 0.9% hexene-3-cis/trans, 2.8% hexene-2-trans, 42.9% 2-methylpentene-2, 2.4% hexene-2-cis and 12.4% 2,3-dimethylbutene-2), 6.4% $C_9$-olefines and higher.

EXAMPLE 22

Temperature: 20° C.
Pressure: 1 atm.
Solvent: 25 ml. chlorobenzene.
Monomer: Propene.
Catalyst: 23.2 mg. $NiCl_2 \cdot [2,4,6\text{-trimethylpyridine}]_2$ and 63.48 mg. $Al(ethyl)Cl_2$.
Reaction time: 30 min.
Reaction product formed: 34 ml.

Composition of product 84.0% $C_6$-olefines (of which 0.7% 4-methylpentene-1, 1.9% 4-methylpentene-2-cis, 14.5% 4-methylpentene-2-trans, 1.3% 2-methylpentene-1, 4.5% hexene-3-cis/trans, 12.3% hexene-2-trans, 53.5% 2-methylpentene-2, 5.0% hexene-2-cis and 6.2% 2,3-dimethylbutene-2), 16% $C_9$-olefines and higher.

EXAMPLE 23

Temperature: 20° C.
Pressure: 1 atm.
Solvent: 25 ml. chlorobenzene.
Monomer: Propene.
Catalyst: 38.5 mg. $NiCl_2 \cdot [P(N(ethyl)_2)_3]_2$ and 63.48 mg. $Al(ethyl)Cl_2$
Reaction time: 30 min.
Reaction product formed: 19 ml.

Composition of product 96.1% $C_6$-olefines (of which 0.4% 4-methylpentene-1, 1.1% 4-methylpentene-2-cis, 13.6% 2,3-dimethylbutene-1, 17.4% 4-methylpentene-2-trans, 6.7% 2-methylpentene-1, 2.4% hexene-3-cis/trans, 6.1% hexene-2-trans, 41.2% 2-methylpentene-2, 2.2% hexene-2-cis and 8.9% 2,3-dimethylbutene-2), 3.9% $C_9$-olefines and higher.

EXAMPLE 24

Temperature: 20° C.
Pressure: 1 atm.
Solvent: 25 ml. chlorobenzene.
Monomer: Propene.
Catalyst: 45.1 mg. $NiCl_2 \cdot [PO(cyclohexyl)_3]_2$ and 63.49 mg. $Al(ethyl)Cl_2$.
Reaction time: 30 min.
Reaction product formed: 15 ml.

Composition of product 93.3% $C_6$-olefines (of which 0.5% 4-methylpentene-1, 1.9% 4-methylpentene-2-cis, 11.7% 4-methylpentene-2-trans, 3.8% 2-methylpentene-1, 5.1% hexene-3-cis/trans, 13.5% hexene-2-trans, 53.8% 2-methylpentene-2, 4.9% hexene-2-cis and 4.8% 2,3-dimethylbutene-2), 6.7% $C_9$-olefines and higher.

EXAMPLE 25

Temperature: 20° C.
Pressure: 1 atm.
Solvent: 25 ml. chlorobenzene.
Monomer: Propene.
Catalyst: 12.1 mg. $NiCl_2 \cdot [ethylenediamine]_2$ and 63.48 mg. $Al(ethyl)Cl_2$.
Reaction time: 30 min.
Reaction product formed: 7 ml.

Composition of product 92.5% $C_6$-olefines (of which 1.8% 4-methylpentene-1, 6.4% 4-methylpentene-2-cis, 46.4% 2,3-dimethylbutene-1 plus 4-methylpentene-2-trans, 5.6% hexene-3-cis/trans, 14.8% hexene-2-trans, 17.4% 2-methylpentene-2, 4.8% hexene-2-cis and 2.7% 2,3-dimethylbutene-2), 7.5% $C_9$-olefines and higher.

EXAMPLE 26

Temperature: 10° C.
Pressure: 1 atm.
Solvent: 25 ml. chlorobenzene.
Monomer: Ethene:Butene-2 (1:1 gas volume).
Catalyst: 7.26 mg. $NiCl_2 \cdot [P(isopropyl)_3]_2$, 10.0 mg. $P(isopropyl)_3$ and 31.74 mg. $Al(ethyl)Cl_2$.
Reaction time: 30 min.
Reaction product formed: 22 ml.

Composition of product 71.8% $C_4$-olefines (of which 2.9% butene-1, 61.2% butene-2-trans and 35.9% butene-2-cis),
20.0% $C_6$-olefines (of which 10.5% 3-methylpentene-1, 41.0% 2-ethylbutene-1, 6.8% hexene-2-trans, 7.8% 3-methylpentene-2-trans, 3.1% hexene-2-cis and 31.6% 3-methylpentene-2-cis),
8.2% $C_8$-olefines and higher.

EXAMPLE 27

Temperature: 20° C.
Pressure: 1 atm.
Solvent: 25 ml. chlorobenzene.
Monomer: Ethene.
Catalyst: 5.28 mg. $NiCl(cyclopentadienyl) \cdot [P(phenyl)_3]$, 35.0 mg. $P(cyclohexyl)_3$, 31.74 mg. $Al(ethyl)Cl_2$.
Reaction time: 30 min.
Reaction product formed: 5 ml.

Composition of product 88.0% $C_4$-olefines (of which 13.4% butene-1, 53.9% butene-2-trans and 32.7% butene-2-cis),
9.6% $C_6$-olefines (of which 7.9% 3-methylpentene-1, 3.9% hexene-1, 5.9% 2-ethylbutene-1, 17.3% hexene-2-trans, 2.4% 3-methylpentene-2-trans, 6.3% hexene-2-cis and 6.3% 3-methylpentene-2-cis),
2.4% $C_8$-olefines and higher.

EXAMPLE 28

Temperature: 10° C.
Pressure: 1 atm.
Solvent: 25 ml. chlorobenzene.
Monomer: Ethene.
Catalyst: 5.03 mg. $Ni(chloroacetate)_2 \cdot [P(cyclohexyl)_3]_2$, 35.0 mg. $P(cyclohexyl)_3$ and 31.74 mg. $Al(ethyl)Cl_2$.
Reaction time: 30 min.
Reaction product formed: 16 ml.

Composition of product 69.7% $C_4$-olefines (of which 10.2% butene-1, 53.0% butene-2-trans and 36.8% butene-2-cis),
24.0% $C_6$-olefines (of which 8.2% 3-methylpentene-1, 1.4% hexene-1, 60.1% 2-ethylbutene-1, 8.1% hexene-2-trans, 4.6% 3-methylpentene-2-trans, 5.4% hexene-2-cis and 12.3% 3-methylpentene-2 cis),
6.3% $C_8$-olefines and higher.

EXAMPLE 29

Temperature: 20° C.
Pressure: 1 atm.
Solvent: 25 ml. chlorobenzene.
Monomer: Ethene.
Catalyst: 4.37 mg. $NiCrO_4$, 10.0 mg. $P(isopropyl)_3$ and 31.64 mg. $Al(ethyl)Cl_2$.
Reaction time: 30 min.
Reaction product formed: 5 ml.

Composition of product 77.7% $C_4$-olefines (of which 7.5% butene-1, 63.3% butene-2-trans and 29.2% butene-2-cis),
18.2% $C_6$-olefines (of which 4.1% 3-methylpentene-1, 3.8% hexene-1, 21.4% 2-ethylbutene-1, 35.3% hexene-2-trans, 7.3% 3-methylpentene-2-trans, 9.0% hexene-2-cis and 19.2% methylpentene-2-cis),
4.1% $C_8$-olefines and higher.

EXAMPLE 30

Temperature: 20° C.
Pressure: 1 atm.
Solvent: 25 ml. dichloroethane.
Monomer: Ethene.
Catalyst: 6.67 mg. $NiCl_2 \cdot [P(n-butyl)_3]_2$, 15.87 mg. $Al(ethyl)Cl_2$.

At reaction times 15 and 30 min. samples for analysis were taken from the reaction mixture. The samples had the following compositions respectively:

Reaction time: 15 min.

Composition of product 72.0% $C_4$-olefines (of which 1.6% butene-1, 70.9% butene-2-trans and 27.4% butene-2-cis),
22.8% $C_6$-olefines (of which 0.9% 3-methylpentene-1, 9.2% 2-ethylbutene-1, 17.5% hexene-2-trans, 20.7% 3-methylpentene-2-trans, 5.4% hexene-2-cis and 46.3% 3-methylpentene-2-cis),
5.2% $C_8$-olefines and higher Reaction time: 50 min.

Composition of product 57.9% $C_4$-olefines (of which 1.5% butene-1, 71.4% butene-2-trans and 27.1% butene-2-cis),
35.6% $C_6$-olefines (of which 0.8% 3-methylpentene-1, 9.5% 2-ethylbutene-1, 10.2% hexene-2-trans, 24.6% 3-methylpentene-2-trans, 4.4% hexene-2-cis and 50.5% 3-methylpentene-2-cis),
6.5% $C_8$-olefines and higher Reaction time: 60 min.

Composition of product 50.9% $C_4$-olefines (of which 2.4% butene-1, 70.3% butene-2-trans and 27.3% butene-2-cis),
42.5% $C_6$-olefines (of which 0.9% 3-methylpentene-1, 9.9% 2-ethylbutene-1, 7.9% hexene-2-trans, 24.6% 3-methylpentene-2-trans, 4.8% hexene-2-cis and 51.9% 3-methylpentene-2-cis),
6.6% $C_8$-olefines and higher.

The run was stopped after a reaction time of 60 min.

Reaction product formed: 17 ml.

EXAMPLE 31

Temperature: 20° C.
Pressure: 1 atm.
Solvent: 25 ml. chlorobenzene.
Monomer: Ethene.
Catalyst: 17.3 mg. $NiBr(NO)[P(phenyl)_3]_2$ and 31.74 mg. $Al(ethyl)Cl_2$.
Reaction time: 30 min.
Reaction product formed: 10 ml.

Composition of product 79.7% $C_4$-olefines (of which 2.3% butene-1, 68.7% butene-2-trans and 29.0% butene-2-cis),
18.8% $C_6$-olefines (of which 1.0% 3-methylpentene-1, 12.6% 2-ethylbutene-1, 12.3% hexene-2-trans, 24.4% 3-methylpentene-2-trans, 9.0% hexene-2-cis and 40.7% 3-methylpentene-2-cis),
1.5% $C_8$-olefines and higher.

EXAMPLE 32

Temperature: 20° C.
Pressure: 1 atm.
Solvent: 25 ml. chlorobenzene.
Monomer: Ethene.
Catalyst: 13.9 mg. $Ni(NO_2)_2 \cdot [P(n-butyl)_3]_2$ and 31.74 mg. $Al(ethyl)Cl_2$.
Reaction time: 30 min.
Reaction product formed: 15 ml.

Composition of product 40.2% $C_4$-olefines (of which 3.0% butene-1, 67.3% butene-2-trans and 29.7% butene-2-cis),
55.4% $C_6$-olefines (of which 0.3% 3-methylpentene-1, 7.3% 2-ethylbutene-1, 4.3% hexene-2-trans, 29.1% 3-methylpentene-2-trans, 1.5% hexene-2-cis and 57.5% 3-methylpentene-2-cis),
4.4% $C_8$-olefines and higher.

EXAMPLE 33

Temperature: 20° C.
Pressure: 1 atm.
Solvent: 25 ml. chlorobenzene.
Monomer: Ethene.
Catalyst: 6.67 mg. $NiCl_2 \cdot [P(n-butyl)_3]_2$ and 15.1 mg. $Al(ethyl)_2Cl$.
Reaction time: 15 min.

At reaction time 15 min., a sample was taken from the reaction mixture for analysis. It had the following composition:

Composition of product 81.4% $C_4$-olefines (of which 2.5% butene-1, 70.1% butene-2-trans and 27.4% butene-2-cis),
17.0% $C_6$-olefines (of which 20.5% 2-ethylbutene-1, 12.0% hexene-2-trans, 21.7% 3-methylpentene-2-trans, 6.0% hexene-2-cis and 39.8% 3-methylpentene-2-cis),
1.6% $C_8$-olefines and higher.

Reaction time: 60 min.

Composition of product 75.8% $C_4$-olefines (of which 2.2% butene-1, 70.9% butene-2-trans and 26.9% butene-2-cis),
22.6% $C_6$-olefines (of which 0.7% 3-methylpentene-1, 20.1% 2-ethylbutene-1, 11.0% hexene-2-trans, 22.0% 3-methylpentene-2-trans 3.5% hexene-2-cis and 42.5% 3-methylpentene-2-cis),
1.6% $C_8$-olefines and higher.

The run was stopped after a reaction time of 60 min.

Reaction product formed: 12 ml.

EXAMPLE 34

Temperature: 20° C.
Pressure: 1 atm.
Solvent: 25 ml. benzene.
Monomer: Ethene.
Catalyst: 66.7 mg. $NiCl_2 \cdot [P(n-butyl)_3]_2$, 32.75 mg. $P(phenyl)_3$ and 16.8 mg. $Be(ethyl)_2$.
Reaction time: 30 min.
Reaction product formed: 8 ml.

Composition of product 89.5% C₄-olefines (of which 2.4% butene-1, 68.8% butene-2-trans and 28.8% butene-2-cis),
8.5% C₆-olefines (of which 6.7% hexene-3-cis/trans, 22.4% 2-ethylbutene-1, 20.2% hexene-2-trans, 18.0% 3-methylpentene-2-trans and 32.7% 3-methylpentene-2-cis),
2.0% C₈-olefines and higher.

EXAMPLE 35

Temperature: 20° C.
Pressure: 1 atm.
Solvent: 25 ml. chlorobenzene.
Monomer: Ethene.
Catalyst: 6.67 mg. NiCl₂·[P(n-butyl)₃]₂ and 15.5 mg. Al₂(ethyl)₃Cl₃.

At reaction time 15 min. a sample was taken from the reaction mixture for analysis. It had the following composition:

Composition of product 57.5% C₄-olefines (of which 2.0% butene-1, 69.6% butene-2-trans and 28.5% butene-2-cis),
39.2% C₆-olefines (of which 0.3% 3-methylpentene-1, 10.1% 2-ethylbutene-1, 7.2% hexene-2-trans, 26.7% 3-methylpentene-2-trans, 5.3% hexene-2-cis and 50.4% 3-methylpentene-2-cis),
3.3% C₈-olefines and higher.

The run was stopped after a reaction time of 60 min.

Reaction product formed: 17 ml.

Composition of product 53.9% C₄-olefines (of which 2.2% butene-1, 71.6% butene-2-trans and 26.2% butene-2-cis),
42.1% C₆-olefines (of which 0.4% 3-methylpentene-1, 12.5% 2-ethylbutene-1, 6.8% hexene-2-trans, 39.3% 3-methylpentene-2-trans, 4.3% hexene-2-cis and 36.7% 3-methylpentene-2-cis),
4.0% C₈-olefines and higher.

EXAMPLE 36

Temperature: 20° C.
Pressure: 1 atm.
Solvent: 25 ml. benzene.
Monomer: Propene.
Catalyst: 6.1 mg. Ni(Cl-acetate)₂ and 97.5 mg.
   Al(ethyl)Cl₂·P(phenyl)₃
Reaction time: 30 min.
Reaction product formed: 10 ml.

Composition of product

92% C₆-olefines (of which 0.5% 4-methylpentene-1, 2.5% 4-methylpentene-2-cis, 2.0% 2,3-dimethylbutene-1, 26.1% 4-methylpentene-2-trans, 3.0% 2-methylpentene-1, 3.5% hexene-3-cis/trans, 11.0% hexene-2-trans, 40.8% 2-methylpentene-2, 2.5% hexene-2-cis and 8.1% 2,3-dimethylbutene-2),
8% C₉-olefines and higher.

EXAMPLE 37

Temperature: 20° C.
Pressure: 1 atm.
Solvent: 25 ml. chlorobenzene.
Monomer: Ethene.
Catalyst: 8.2 mg. Ni(S—C₆H₅)₂·[P-(n-butyl)₃]₂ and 63.48 mg. Al(ethyl)Cl₂.
Reaction time: 30 min.
Reaction product formed: 17 ml.

Composition of product 41.7% C₄-olefines (of which 2.1% butene-1, 71.7% butene-2-trans and 26.2% butene-2-cis),
47.7% C₆-olefines (of which 0.3% 3-methylpentene-1, 2.9% 2-ethylbutene-1, 4.0% hexene-2-trans, 28.8% 3-methylpentene-2-trans, 64.1% 3-methylpentene-2-cis),
10.6% C₈-olefines and higher.

EXAMPLE 38

Temperature: 20° C.
Pressure: 1 atm.
Solvent: 25 ml. chlorobenzene.
Monomer: Ethene.
Catalyst: 8.53 mg. cobalt(III)acetylacetonate and 62.0 mg. Al₂(ethyl)₃Cl₃.
Reaction time: 30 min.
Reaction product formed: 2 ml.

Composition of product

95% C₄-olefines (of which 2.0% butene-1, 69.8% butene-2-trans and 29.2% butene-2-cis),
5% C₆-olefines and higher.

EXAMPLE 39

Temperature: 20° C.
Pressure: 1 atm.
Solvent: 25 ml. chlorobenzene.
Monomer: Ethene.
Catalyst: 9.77 mg. (C₅H₅)Ni·[P(phenyl)₃]CH₃ and 63.48 mg. Al(ethyl)Cl₂
Reaction time: 30 min.
Reaction product formed: 6 ml.

Composition of product 95.9% C₄-olefines (of which 2.5% butene-1, 69.4% butene-2-trans and 28.1% butene-2-cis),
3.3% C₆-olefins (of which 6.7% 3-methylpentene-1, 22.5% 2-ethylbutene-1, 22.5% hexene-2-trans, 12.4% 3-methylpentene-2-trans, 11.2% hexene-2-cis and 24.7% 3-methylpentene-2-cis),
0.8% C₈-olefines and higher.

EXAMPLE 40

Temperature: 20° C.
Pressure: 1 atm.
Solvent: 25 ml. chlorobenzene.
Monomer: Ethene.
Catalyst: 3.34 mg. NiCl₂·[P(n-butyl)₃]₂, 25.3 mg. P(n-butyl)₃ and 31.74 mg. Al(ethyl)Cl₂ (the Al- and P-components being prereacted for one hour at 50° C.).
Reaction time: 60 min.
Reaction product formed: 14.5 ml.

Composition of product 70.6% C₄-olefins (of which 2.2% butene-1, 71.2% butene-2-trans and 26.6% butene-2-cis),
28.1% C₆-olefines (of which 0.8% 3-methylpenetene-1, 20.3% 2-ethylbutene-1, 9.6% hexene-2-trans, 23.0% 3-methylpentene-2-trans, 2.6% hexene-2-cis and 43.7% 3-methylpentene-2-cis),
1.3% C₈-olefines and higher.

EXAMPLE 41

Temperature: 40° C.
Pressure: 1 atm.
Solvent: n-heptane, 25 ml.
Monomer: Ethene.
Catalyst, 4.91 mg. NiBr₂·[P(C₆H₁₁)₃]₂, 3.90 mg. NiBr₂ [P(-n-butyl)₃]₂ and 63.48 mg. Al(ethyl)Cl₂
Reaction time: 30 min.
Reaction product formed: 4 ml.

Composition of product 75.7% C₄-olefines (of which 2.6% butene-1, 68.8% butene-2-trans and 28.6% butene-2-cis),
22.5% C₆-olefins (of which 2.6% 3-methylpentene-1, 4.3% hexene-3-cis/trans, 15.6% 2-ethylbutene-1, 12.8% hexene-2-trans, 20.8% 3-methylpentene-2-trans, 4.3% hexene-2-cis and 39.6% 3-methylpentene-2-cis),
1.8% C₈-olefines and higher.

EXAMPLE 42

Temperature: 40° C.
Pressure: 1 atm.
Solvent: 25 ml.-n-heptane.
Monomer: Ethene.
Catalyst: 3.71 mg. $NiBr_2 \cdot [(C_6H_{11})_2P(CH_2)_5P(C_6H_{11})_2]$ and 63.48 mg. $Al(ethyl)Cl_2$.
Reaction time: 30 min.
Reaction product formed: 4 ml.

Composition of product 67.6% $C_4$-olefines (of which 6.7% butene-1, 59.5% butene-2-trans and 33.8% butene-2-cis),
28.4% $C_6$-olefins (of which 10.3% 3-methylpentene-1, 0.5% hexene-1, 2.3% hexene-3-cis/trans, 35.3% 2-ethylbutene-1, 10.5% hexene-2-trans, 14.9% 3-methylpentene-2-trans, 3.5% hexene-2-cis and 22.7% 3-methylpentene-2-cis),
4.0% $C_8$-olefins and higher.

EXAMPLE 43

Temperature: 20° C.
Pressure: 1 atm.
Solvent: 25 ml. chlorobenzene.
Monomer: Ethene.
Catalyst: 40.8 mg. $cobalt(II)chloride \cdot [P(phenyl)_3]_2$, 32.7 mg. $P(phenyl)_3$ and 62.0 mg. $Al(ethyl)_3Cl_3$.
Reaction time: 60 min.
Reaction product formed: 6 ml.

Composition of product

99% $C_4$-olefins (of which 2.0% butene-1, 69.4% butene-2-trans and 28.6% butene-2-cis),
1% $C_6$-olefins (of which 8.5% hexene-3-cis/trans, 25.9% 2-ethylbutene-1, 26.4% hexene-2-trans, 9.1% 3-methylpentene-2-trans, 8.7% hexene-2-cis and 21.4% 3-methylpentene-2-cis).

EXAMPLE 44

Temperature: 40° C.
Pressure: 1 atm.
Solvent: 25 ml. n-heptane.
Monomer: Ethene:Propene (1:1)
Catalyst: 3.85 mg. $NiBr_2 \cdot [PH(C_6H_{11})_2]_2$ and 63.48 mg. $Al(ethyl)Cl_2$.
Reaction time: 30 min.
Reaction product formed: 2 ml.

Composition of product 49.9% $C_4$-olefins (of which 2.9% butene-1, 68.1% butene-2-trans and 29.0% butene-2-cis),
34.8% $C_5$-olefines (of which 1.0% pentene-1, 2.4% 2-methylbutene - 1, 40.9% pentene - 2 - trans, 13.5% pentene-2-cis and 42.2% 2-methylbutene-2),
10.3% $C_6$-olefines (of which 4.0% 4-methylpentene-1 + 3 - methylpentene - 1, 7.4% 4 - methylpentene-2-cis, 32.4% 4-methylpentene-2-trans, 1.6% 2-methylpentene-1, 3.7% hexene-3+2-ethylbutene-1, 12.8% hexene-2-trans, 11.8% 2-methylpentene-2, 7.4% 3-methylpentene-2-trans, 4.2% hexene-2-cis, 12.8% 3-methylpentene-2-cis and 1.9% 2,3-dimethylbutene-2),
5.0% $C_7$-olefines and higher.

EXAMPLE 45

Temperature: 20° C.
Pressure: 1 atm.
Solvent: 25 ml. chlorobenzene.
Monomer: Propene.
Catalyst: 81.7 mg. $NiCl_2 \cdot [P(C_6H_5)_3]_2$, 3.2 mg. $Al(ethyl)Cl_2$ and 66.7 mg. $AlBr_3$.
Reaction time: 15 min.
Reaction product formed: 16 ml.

Composition of product 93.5% $C_6$-olefines (of which 0.5% 4-methylpentene-1, 2.2% 4-methylpentene-2-cis, 7.6% 2,3-dimethylbutene-1 19.1% 4-methylpentene-2-trans, 9.6% 2-methylpentene-1, 3.6% hexene-3-cis/trans, 10.5% hexene-2-trans, 40.9% 2-methylpentene-2, 3.6% hexene-2-cis and 2.4% 2,3-dimethylbutene-2),
6.5% $C_9$-olefines and higher.

EXAMPLE 46

Temperature: 20° C.
Pressure: 1 atm.
Solvent: 25 ml. chlorobenzene.
Monomer: Propene.
Catalyst: 22.0 mg. $Ni(acetate)_2$ and 104.3 mg. $Al(OC_4H_9)_2Cl$
Reaction time: 30 min.
Reaction product formed: 5 ml.

Composition of product

93% $C_6$-olefines (of which 0.4% 4-methylpentene-1, 2.2% 4-methylpentene-2-cis, 0.8% 2,3-dimethylbutene-1, 16.9% 4-methylpentene-2-trans, 5.4% 2-methylpentene-1, 4.7% hexene-3-cis/trans, 11.8% hexene-2-trans, 49.8% 2-methylpentene-2, 3.8% hexene-2-cis and 4.2% 2,3-dimethylbutene-2),
7% $C_9$-olefines and higher.

EXAMPLE 47

Temperature: 40° C.
Pressure: 1 atm.
Solvent: 23.75 ml. chlorobenzene.
Monomer: Ethene/propene (1/1 gas volume)
Catalyst: 5.04 mg. $[P(cyclohexyl)_3]_2 \cdot Ni(Cl-acetate)_2$, 1.25 ml. of a chlorobenzene solution containing 100 mmoles/l of $P(cyclohexyl)_3$+200 mmoles/l of $Al(ethyl)Cl_2$ preheated to 40° C. for one hour.
Reaction time: 30 min.
Reaction product formed: 5 ml.

Composition of product 21.2% $C_4$-olefines (of which 8.9% butene-1, 50.0% butene-2-trans and 41.1% butene-2-cis),
44.6% $C_5$-olefines (of which 93.0% methylbutenes and 7.0% n-pentenes),
24.2% $C_6$-olefines,
10.0% $C_7$-olefines and higher.

EXAMPLE 48

Temperature: 40° C.
Solvent: 12.5 ml. chlorobenzene.
Monomer: Butene, 12.5 ml., Propene (50 ml./min.).
Catalyst: 50.5 mg. $Ni(trichloroacetate)_2 \cdot [P(n-butyl)_3]_2$ and 15.87 mg. $Al(ethyl)Cl_2$.
Reaction time: 60 min.

Composition of product

In addition to unreacted butene, 3.8 grams $C_6$-olefines,
4.0 grams $C_7$-olefines and
1.1 grams $C_8$-olefines and higher, are obtained.

EXAMPLE 49

Temperature: 7½° C.
Pressure: 1 atm.
Solvent: 25 ml. chlorobenzene.
Monomer: 2.4 g. butene, 60% butene-1, 12% butene-2-cis, 28% butene-2-trans)
Catalyst: 8.1 mg. $NiCl_2 \cdot [P(n-butyl)_3]_2$ and 63.48 mg. $Al(ethyl)Cl_2$.
Reaction time: 90 min.
$C_8$-olefines formed: 1.1 grams.

EXAMPLE 50

Temperature: −10° C.
Pressure: 40 atm.
Solvent: 25 ml. benzene.
Monomer: Ethene.
Catalyst: 4.1 mg. $NiCl_2 \cdot [P(phenyl)_3]_2$ and 15.87 mg. $Al(ethyl)Cl_2$.
Reaction time: 30 min.
Reaction product formed: 30 ml.

Composition of product

6½% $C_4$-olefines (of which 3.5% butene-1, 67.0% butene-2-trans and 30.5% butene-2-cis),
30% $C_6$-olefines (of which 0.8% 3-methylpentene-1, 16.4% 2-ethylbutene-1, 15.8% hexene-2-trans, 21.5% 3-methylpentene-2-trans, 3.8% hexene-2-cis and 41.6% 3-methylpentene-2-cis),
10% $C_8$-olefines and higher.

EXAMPLE 51

Temperature: 20° C.
Pressure: 4 atm.
Solvent: 25 ml. chlorobenzene.
Monomer: Ethene.
Catalyst: 13.4 mg. $NiCl_2 \cdot [P(n-butyl)_3]_2$ and 15.87 mg. $Al(ethyl)Cl_2$.
Reaction time: 30 min.
Reaction product formed: 55 ml.

Composition of product 42.2% $C_4$-olefines (of which 1.7% butene-1, 66.2% butene-2-trans and 32.1% butene-2-cis),
53.4% $C_6$-olefines (of which 0.8% 3-methylpentene-1, 1.6% hexene-3-cis/trans, 8.9% 2-ethylbutene-1, 5.3% hexene-2-trans, 29.4% 3-methylpentene-2-trans, 1.8% hexene-2-cis and 52.2% 3-methylpentene-2-cis),
4.4% $C_8$-olefines and higher.

EXAMPLE 52

Temperature: 20° C.
Pressure: 4 atm.
Solvent: 25 ml. chlorobenzene.
Monomer: Ethene.
Catalyst: 81.8 mg $NiCl_2 \cdot [p(phenyl)_3]_2$ and 133.3 mg. $AlBr_3$
Reaction time: 30 min.
Reaction product formed: 15 ml.

Composition of product 90.1% $C_4$-olefins (of which 3.3% butene-1, 67.7% butene-2-trans and 29.0% butene-2-cis),
5.2% $C_6$-olefins (of which 7.2% 3-methylpentene-1, 0.6% hexene-1, 11.2% hexene-3-cis/trans and 2-ethylbutene-1, 26.4% hexene-2-trans, 13.3% 3-methylpentene-2-trans, 8.6% hexene-2-cis and 32.7% 3-methylpentene-2-cis),
4.7% $C_8$-olefins and higher.

EXAMPLE 53

Temperature: 40° C.
Pressure: 5 atm.
Solvent: 25 ml. chlorobenzene.
Monomer: Ethene.
Catalyst: 13.7 mg. $NiBr_2$, 46.5 mg. diphenyl sulfide and 127 mg. $Al(ethyl)Cl_2$.
Reaction time: 60 min.
Reaction product formed: 7 ml.

Composition of product 50.8% $C_4$-olefines (of which 13.7% butene-1, 59.7% butene-2-trans and 26.6% butene-2-cis),
24.9% $C_6$-olefines (of which 4.3% 3-methylpentene-1, 3.7% hexene-1, 21.6% hexene-3-cis/trans and 2-ethyl-butene-1, 44.7% hexene-2-trans, 2.9% 3-methylpentene-2-trans, 15.2% hexene-2-cis and 7.6% 3-methylpentene-2-cis),
24.3% $C_8$-olefines and higher.

EXAMPLE 54

Temperature: 40° C.
Pressure: 5 atm.
Solvent: 25 ml. chlorobenzene.
Monomer: Ethene.
Catalyst: 13.7 mg. $NiBr_2$, 18 mg. tetrahydrofuran and 127 mg. $Al(ethyl)Cl_2$.
Reaction time: 60 min.
Reaction product formed: 16 ml.

Composition of product 46.3% $C_4$-olefins (of which 11.1% butene-1, 62.0% butene-2-trans and 26.9% butene-2-cis),
33.0% $C_6$-olefins (of which 3.4% 3-methylpentene-1, 3.1% hexene-1, 21.2% hexene-3-cis/trans and 2-ethyl-butene-1, 43.3% hexene-2-trans, 4.2% 3-methylpentene-2-trans, 14.5% hexene-2-cis and 10.2% 3-methylpentene-2-cis),
20.7% $C_8$-olefines and higher.

What is claimed is:

1. In a process for the preparation of mono-olefines having a high content of β-olefines in the range of $C_4$–$C_{50}$ by conversion by dimerization, codimerization, polymerization and copolymerization of the mono-olefines, the improvement wherein olefines from the range $C_2$–$C_{15}$ are converted in the presence of a catalyst system comprising:

(a) a transition metal compound selected from the group consisting of nickel acetate, cobalt acetate, nickel chloroacetate, and nickel trichloroacetate, (b) a Lewis acid of the formula $AlR_bY_{3-b}$, wherein R is an alkyl group, Y is selected from the group consisting of halide and alcoholate groups, and $b=0$–2, and (c) a Lewis base selected from the group consisting of alkylphosphine, cycloalkyl phosphine and phenyl phosphine at the temperature at which the transition metal in the transition metal compounds is not substantially reduced to metallic form.

2. The improvement according to claim 1, wherein the Lewis base is selected from the group consisting of tri-n-butyl-phosphine, tri-cyclohexyl-phosphine and tri-phenyl-phosphine.

3. The improvement according to claim 1, wherein the transition metal compound is selected from the group consisting of nickel acetate and cobalt acetate, the Lewis acid is ethyl aluminum chloride and the Lewis base is tri-phenylphosphine.

References Cited

UNITED STATES PATENTS

| | | | |
|---|---|---|---|
| 2,969,408 | 1/1961 | Nowlin et al. | 260—683.15 |
| 3,321,546 | 5/1967 | Roest et al. | 260—683.15 |
| 3,306,948 | 2/1967 | Kealy | 260—680 |
| 3,379,706 | 4/1968 | Wilke | 260—683.15 X |
| 3,513,218 | 5/1970 | Faltings et al. | 260—683.15 |
| 3,390,201 | 6/1968 | Drew | 260—676 |
| 3,482,001 | 12/1969 | Eberhardt | 260—683.15 |
| 3,485,881 | 12/1969 | Zuech | 260—666 |
| 3,511,891 | 5/1970 | Taylor et al. | 260—683.15 |
| 3,355,510 | 11/1967 | Cannell et al. | 260—683.15 |
| 3,096,385 | 7/1963 | McConnell | 260—683.15 |

PAUL M. COUGHLAN, JR., Primary Examiner

U.S. Cl. X.R.

252—428, 429 B, 431 C, 431 N, 431 P; 260—683.2